United States Patent [19]

Segerström

[11] Patent Number: 5,280,765
[45] Date of Patent: Jan. 25, 1994

[54] DEVICE FOR ACHIEVING VISUAL MARKING OF A LINE OR WIRE

[75] Inventor: Bo T. Segerström, Malmköping, Sweden

[73] Assignee: Saab Helikopter Aktiebolag, Sweden

[21] Appl. No.: 859,579

[22] Filed: Mar. 27, 1992

[30] Foreign Application Priority Data

Apr. 9, 1991 [SE] Sweden .................. 9101035
Sep. 20, 1991 [SE] Sweden .................. 9102734
Dec. 20, 1991 [SE] Sweden .................. 9103788

[51] Int. Cl.$^5$ ............................................. G08B 5/00
[52] U.S. Cl. .......................... 116/209; 116/DIG. 33
[58] Field of Search ................ 116/209, DIG. 33; 29/433, 463, 709, 714

[56] References Cited

U.S. PATENT DOCUMENTS

| | | | |
|---|---|---|---|
| 3,362,377 | 1/1968 | Hill et al. ........................... | 116/209 |
| 3,430,325 | 3/1969 | Lematta ............................ | 116/209 X |
| 4,474,133 | 10/1984 | Anderson et al. ................ | 116/DIG. 33 X |
| 4,885,835 | 12/1989 | Osgood ............................ | 116/209 X |
| 5,038,465 | 8/1991 | Jans .................................. | 29/463 X |

FOREIGN PATENT DOCUMENTS 0701422  1/1965  Canada ..................... 116/DIG. 33
7808016  2/1979  Netherlands .............. 116/DIG. 33

Primary Examiner—William A. Cuchlinski, Jr.
Assistant Examiner—John L. Beres
Attorney, Agent, or Firm—Lowe, Price, LeBlanc & Becker

[57] ABSTRACT

A device for achieving visual marking of a line by a marking body is described. It relates especially to a substantially horizontal ground wire in a transfer system for high voltage electricity, at a relatively high altitude above the ground.

The device comprises:
a shell, especially in the form of a sphere, divided into two semispheres, carried by
a fastening device, comprising clamping elements, provided to encompass the line in a first position, and to grasp the line fastening, in a second position, and
a carrying device, in turn carried by a lifting device such as a helicopter or crane, which carrying means in said first position of the clamping elements carries the fastening device, and is arranged to be released, in said second position of the clamping elements, from the fastening device, so that said shell, in the form of a marking body, remains attached to said line, free from the carrying device.

10 Claims, 5 Drawing Sheets

DEVICE FOR ACHIEVING VISUAL MARKING OF A LINE OR WIRE

FIELD OF THE INVENTION

This invention relates to a device for achieving visual marking of a line or wire, especially for marking of a substantially horizontal ground wire in a transfer system for high voltage electricity, at a relatively high altitude above the ground.

The invention also relates to a method of achieving such visual marking, that is to say to clamp up marking bodies.

BACKGROUND OF THE INVENTION

There is a demand for marking of lines, arranged at a more or less high altitude above the ground, visually, that is to say with marking bodies, in order to make these lines visible for air vehicles like aircraft and helicopters. Telephone lines, supporting steel wires etc. may be mentioned. Firstly lines and wires of the type mentioned introductorily are considered.

Until now it has been very expensive to clamp up such marking bodies on lines at high altitudes. This is especially true for ground wires for transfer systems for 400 kV or 800 kV electricity, which in many cases comprise wires in terrain that is difficult to access, or over sea bays, fiords and lakes.

SUMMARY OF THE INVENTION

The object of the present invention is thus to achieve a device of the type mentioned introductorily that is cheap and simple but also safe in utilization. The object is also to achieve a reliable method of achieving visual marking.

According to the invention a device of the type mentioned introductorily is characterized primarily by the combination of:

a shell, preferably an outer shell, carried by a fastening device, comprising clamping elements, provided to encompass the line, in a first position, and to grasp the line fastening, in a second position, and a carrying means, in turn carried by a lifting device such as a helicopter or crane, which carrying means in said first position carries the fastening device, and is arranged to be released, in said second position, from the fastening device, so that said shell, in the form of a marking body, remains attached to said line, free from the carrying means.

The shell may be formed in many ways, from plates of different sizes and form to bodies of any form, but preferably as a symmetrical, closed body, like a sphere. In a suitable embodiment, the shell is formed as a sphere, divided into two substantially identical semispheres.

Considering the difficulty to hold the device in a correct position in relationship to the line or wire, especially if there is a hard wind, it is suitable to provide the device with indicating means for indicating the correct position of the fastening device in relationship to the line or wire for the clamping elements to grasp the line, cooperating. The indicating means may be attached to the fastening means or preferably to the carrying means and may comprise two contact elements or sensors, arranged at a horizontal distance, which give a signal when both of them get in contact or touch with the line or wire. This embodiment is especially suitable in those cases, when, in said second position of the clamping elements, the carrying means is released from the fastening device by an impulse from an operator, observing the signal. In an alternative embodiment, the signal may give an impulse for automatic release of the carrying means from the fastening device.

Within the scope of the invention, there are many constructional possibilities to bring the clamping elements in a fastening grip of the line, and to release the fastening device from the carrying means.

In one embodiment, the fastening device comprises a first frame portion, which in its lower part is formed like a first clamping element, and a first link arm, like a yoke, pivoted in said first frame portion, the yoke being formed at the inside like a second clamping element, the first link arm being attached, at its portion away from the second clamping element, at a relatively strong spring means, which pretensions said clamping elements towards said second position of said clamping elements, said clamping means being kept in a first position by link arrangement, which when touching the line releases said first link arm, so that the clamping elements go to their second position by the action of the spring means.

In this embodiment, it is suitable to arrange the carrying means fastened releasable at the fastening device, in a first position of the clamping means locked by a protrusion at the first link arm, and in the second position of the clamping means, released from same and thus from the fastening device.

This embodiment may, if the shell is formed like a sphere, divided into two semispheres, be designed in a simple way, so that these semispheres are kept apart from each other in said first position of the clamping means, but are closed together in said second position of the clamping means. This is achieved by fastening the first semisphere at the fastening device and to provide the second semisphere pivoted at its upper portion at the fastening device. In the first position, the second semisphere is kept apart by the first link arm via a second link arm, from the first semisphere. In the second position, the first link arm, via the second link arm brings the two semispheres to close together.

Considering the difficulties to hold the device in the correct position above the line in question, it is suitable to connect the carrying means to at least two, preferably four guide bars, provided to guide the fastening device to the correct position in relationship to the line, when the device is approaching the line, for the clamping elements to grasp the line fastening, cooperating.

The embodiment with a relatively strong spring means, that brings the clamping elements to get into said second position, grasping the line, has certain limitations. It demands, considering the force needed for clamping, a relatively strong spring means and correspondingly a strong fastening device and a strong first link arm, which means that these details must be relatively heavy.

Thus, in an alternative embodiment of the device according to the invention, said fastening device comprises a second frame portion, carrying a first clamping element, preferably formed like a profile piece, for grasping part of the circumference of the line, further comprising a third frame portion, carrying a second clamping element, formed like the first clamping element, a turnable shaft being provided, which by turning by a turning means, brings both frame portions together, so that the clamping elements, from each side, cooperating grasp the line, fastening it.

As it is important that the clamping elements are pressed to the line with a predetermined force, it is suitable to provide the turnable shaft with means, limiting the torque, preferably in the form of an axially limited rotation symmetrical recess of the diameter of the shaft.

To turn the shaft, electric motors are preferred. As there is a demand to fasten the marking body quickly to the line or wire, there is suitably proved turning means with a relatively high first speed of rotation and a low torque, and a relatively low second speed of rotation and a high torque.

The turning means may per se be attached to the fastening means, but it is more economical to put it in carrying relationship to the carrying means, releasable from the turnable shaft by a link arrangement, in said second position of the clamping elements. In this way the turning means, in most cases one or two electric motors may be utilized for all marking bodies that are actual for fastening on a line or wire.

When a line or wire shall be marked visually by marking bodies, it is important that these are fastened at correct distances from each other. One method of achieving this is by giving the positions for fastening the marking bodies by a reference carriage, which is provided with driving wheels for moving along a line with an own driving means, the reference carriage being arranged to be started by an impulse, transferred wirelessly, e.g. by IR radiation.

Preferably, the reference carriage is brought to move a predetermined distance along the line at a transferred impulse.

BRIEF DESCRIPTION OF THE DRAWINGS

The invention shall now be described more in detail, reference being made to the accompanying figures. On these.

DESCRIPTION OF THE PREFERRED EMBODIMENT

Figure 1:
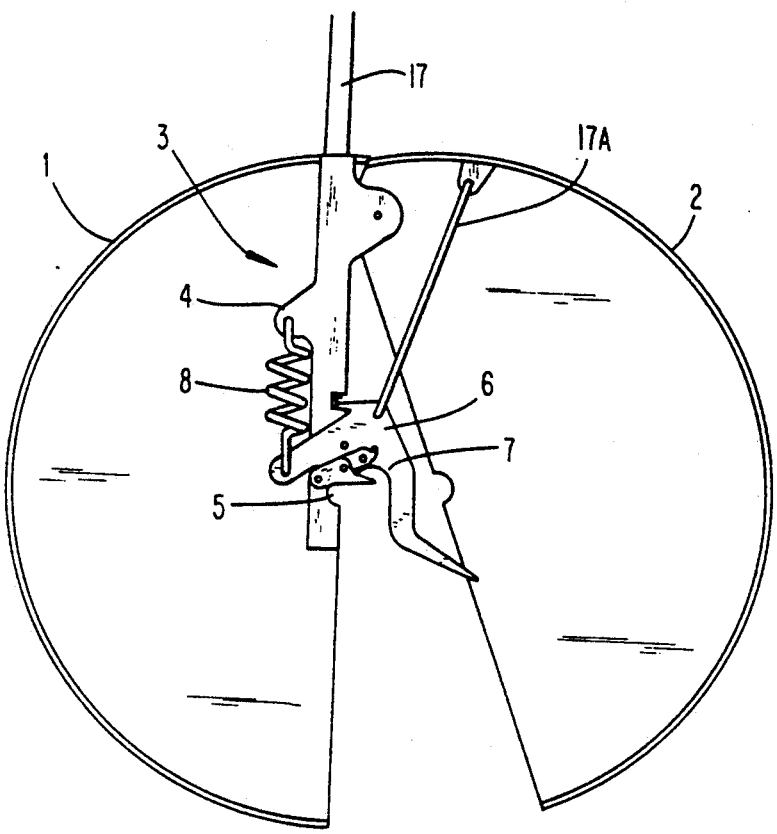
FIG. 1 shows one embodiment of a device according to the invention, in a view from one side, partly in section.
Figure 2:
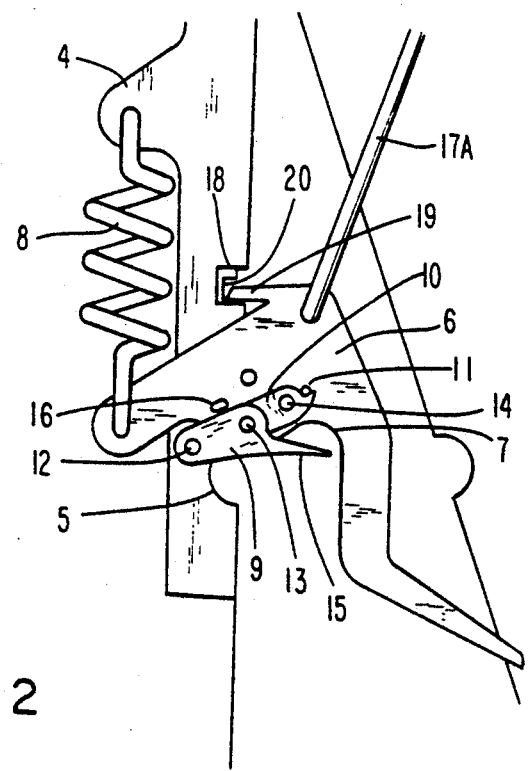
FIG. 2 shows an enlargement of part of a fastening device in FIG. 1.

In FIG. 1, a first and a second semisphere are denoted by 1 and 2. The first of them is attached to a fastening device 3, and the second of them is pivoted at its upper portion in the fastening device 3. The former comprises a first frame portion 4, at its lower portion formed like a first clamping element 5, and a first link arm 6, like a yoke, pivoted in said frame portion 4, the yoke being formed at the inside like a second clamping element 7. At its portion, away from the second clamping element 7, the first link arm 6 is attached to a relatively strong spring means 8, in this case in the form of a screw spring, attached at the first frame portion 4. The spring means 8 pretensions the clamping elements 5, 7 towards said second position, that is to say a position, where the clamping elements can grasp a line. The clamping elements 5, 7 are, however, kept in a first position, in which they may encompass a line, by a second link arm 9, pivoted in said first frame portion 4 at one end, and is pivoted, at the other end, in a third link arm 10. The third link arm 10 is in turn pivoted in the first link arm 6. The size and arrangement of the three link arms 6, 9, 10 is such, with a lock 11 for the turning movement of the third link arm 10 in relationship to the first link arm 6, that the second and the third link arms in a first position nearly form a straight line with their turning axes 12, 13, 14. The turning axis 13 between the first and second link arm is, however, located a little below a straight line between the first and third turning axes 12, 14. In the actual case the second link arm 9 is provided with a protrusion 15, which, when touching the line, snaps over the second and the third link arms, so that the spring means 8 may pull the clamping elements 5, 7 together. The first link arm 6 is designed in such a way, that it guides the line towards the clamping elements, if the line would be located somewhat outside the correct position when the clamping elements 5, 7 are pulled together by the first link arm 6. Suitably, a releasable lock 16 is provided to prevent an unintentional snap of the second and third link arms 9, 10. Of course, this lock 16 has to be removed before the device shall be utilized. A fourth link arm 17A, pivoted in the first link arm 6 and the upper portion of the second semisphere 2, is provided to pull together the semispheres when the clamping elements get into their second position. A carrying means 17 in the form of a rod is placed in a corresponding channel in the first frame portion 4. A recess 18 in the first frame portion 4 admits that a protrusion 19 at the first link arm 6 is put in a recess 20 in the carrying means in said first position of the clamping elements, but moves away, releasing it, and thus the carrying means 17 from the fastening means 3 in the second position of the clamping elements.

Figure 3:
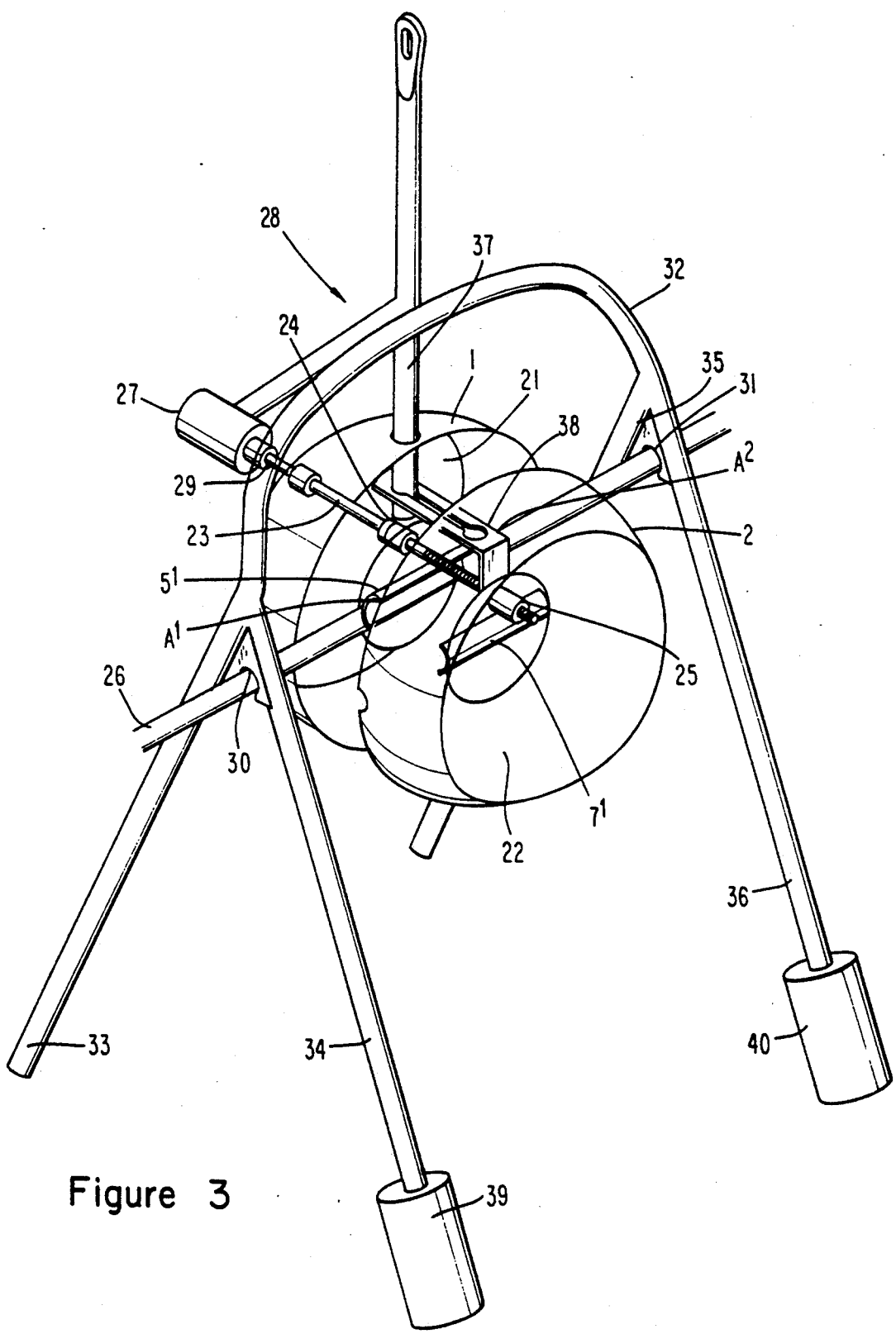
FIG. 3 shows an alternative embodiment of a device according to the invention, in perspective.

In FIG. 3, there is shown an alternative embodiment of the device according to the invention. The fastening device here comprises a schematically shown second frame portion 21, which with a truncated conic support part keeps a first semisphere 1, and a first clamping element $5^1$. A third frame portion 22 supports a second clamping element $7^1$ and, via a truncated conic support part, a second semisphere 2. A turnable shaft 23 is provided with threads, and corresponding sleeves 24, 25 are provided at the second and third frame portions 21, 22 enabling them to be pulled together when turning the shaft 23, so that the clamping elements $5^1$, $7^1$ can grasp the line 26, fastening, if this line is in the correct position. The shaft 23 is turned by an electric motor 27, attached to a carrying means 28. The shaft 23 is provided with a torque limiting recess, in the form of a turned cavity, which bursts when the clamping elements $5^1$, $7^1$ have been brought together around a line 26 with the desired torque at the shaft 23. The fastening device includes at each end of clamping element $5^1$ touch sensitive sensors $A^1$ and $A^2$. These sensors may be electric and connected in a suitable electric circuit which is completed when the sensors contact the wire, as by lighting a lamp or the like.

As an alterative two contacts 30, 31 are provided at a mutual horizontal distance in a yoke 32, being part of the carrying means 28. They indicate the correct position of the fastening device for the clamping elements $5^1$, $7^1$ to grasp the line 26. The carrying means is also provided with four guide bars 33, 34, 35 and 36 which facilitate the orientation of the device in relationship to the line 26.

Different constructions are possible, enabling the release of the carrying means 28 from the fastening device. In this case, the carrying means is formed with a vertical rod 37, which is in carrying connection to the third frame portion 22 by a guide bar 38, formed to maintain the carrying connection, until the third frame portion has achieved a position, corresponding to said second position of the clamping elements, in which position the rod 37 is released from the guide bar 38. In this second position, the shaft 23 is also broken from the electric motor 27, and the carrying means 28 can be lifted away from the marking body. A signal from the contacts 30, 31 may be utilized in a variety of ways. The signal may cause the motor 27 to start. It is also possible to give an operator, via a releasable connection, notice that the device is in the correct position and that the motor may be started by the operator. This is energized by batteries 39, 40 located at the ends of the guide bars 34, 36.

Figure 4:
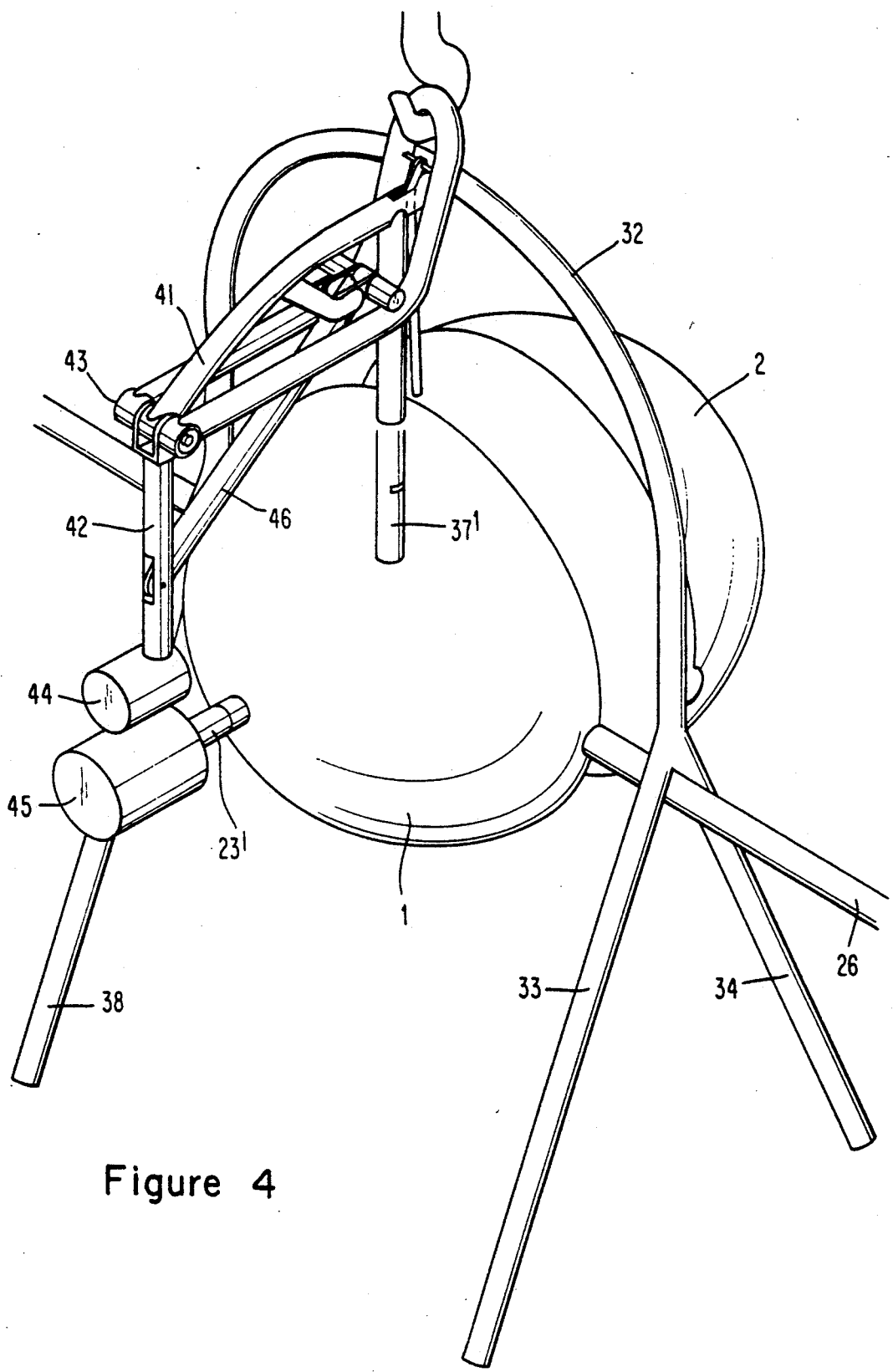
FIG. 4 shows a further embodiment of a device according to the invention, in perspective.
Figure 5:
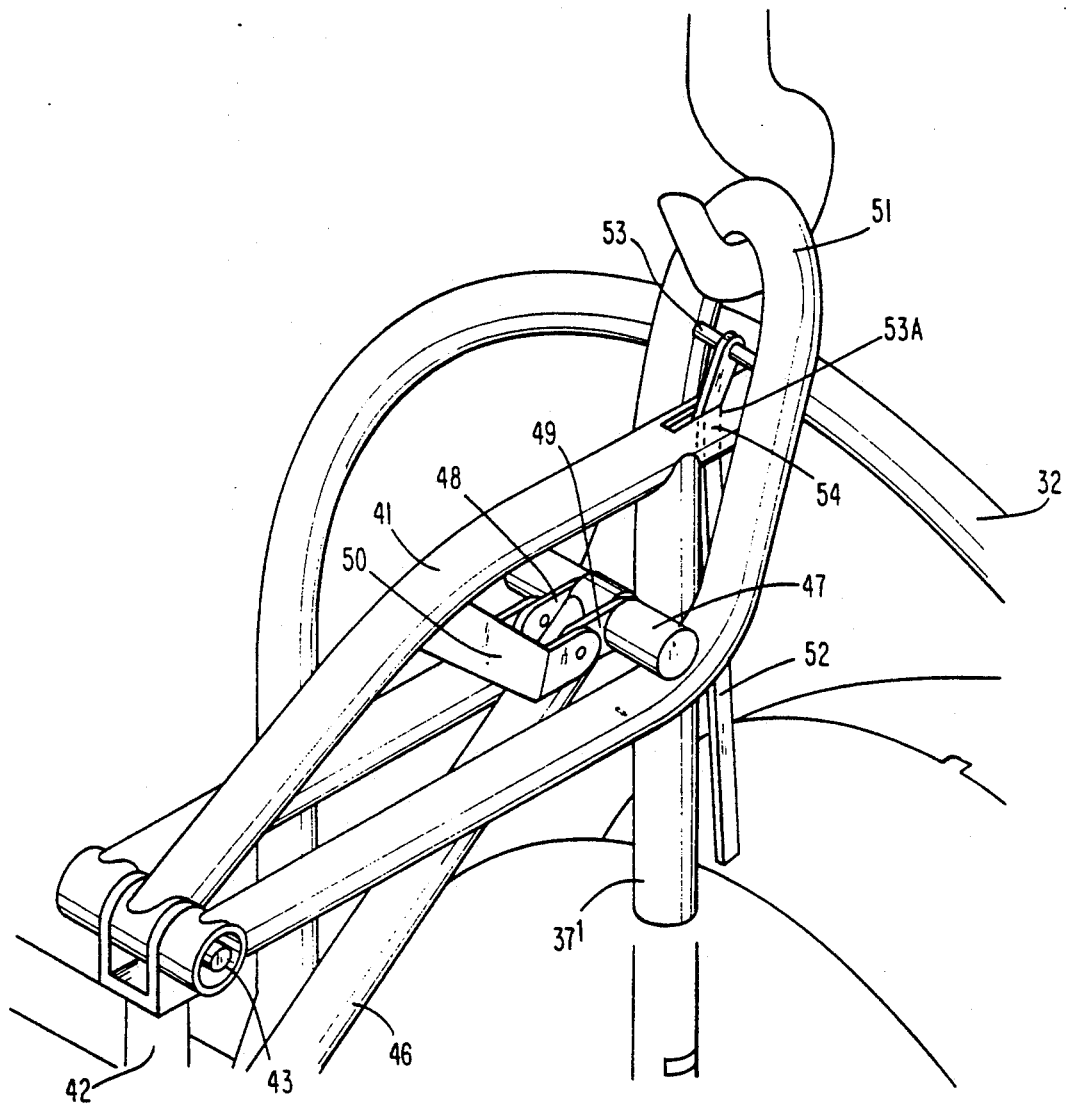
FIG. 5 shows an enlargement of part of a carrying means in FIG. 4.

In FIGS. 4 and 5 there is shown an alternative embodiment of a device according to the invention, which enables a turning means, especially an electric motor, to be released from a turnable shaft, provided to pull the clamping means together without any need to break the shaft. For improved clarity some constructional parts have been omitted in the figure.

Figure 6:
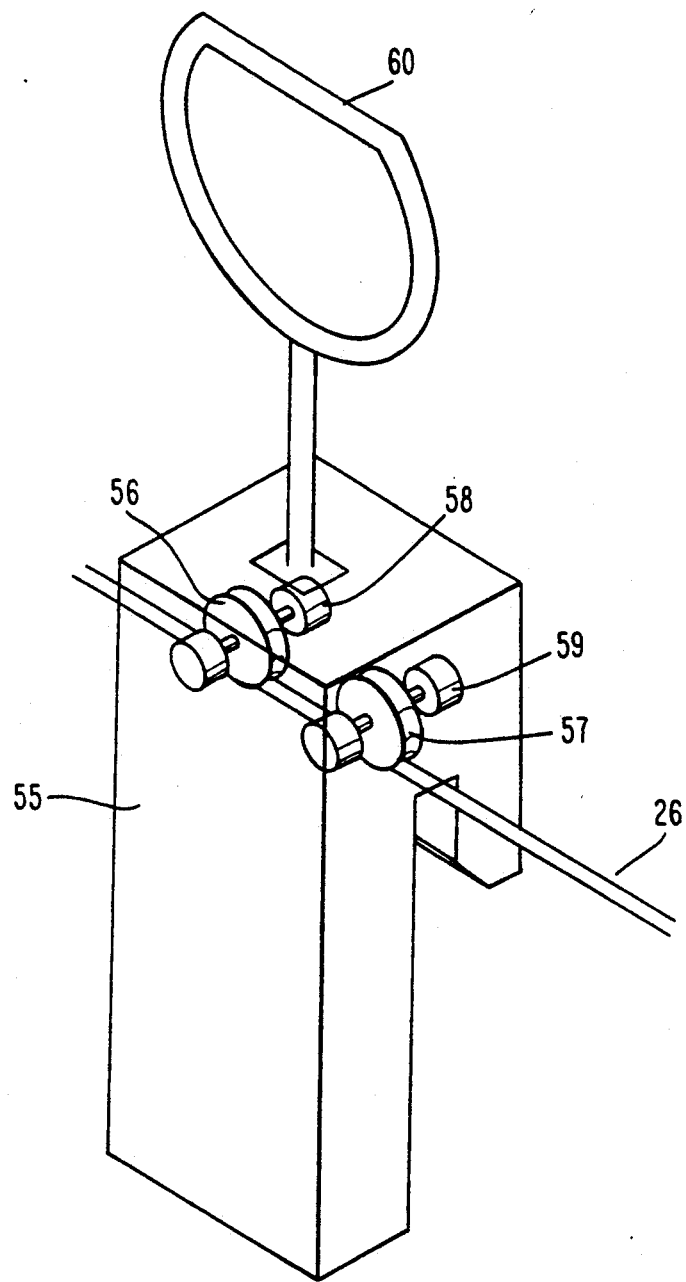
FIG. 6 shows a reference carriage.

The carrying means even here comprises a vertical rod $37^1$, cooperating in carrying connection with a guide bar which is not shown. The function is the same as that, which was described for the embodiment in FIG. 3. The yoke 32 of the carrying means is firmly connected to a rod 41, which carries the vertical rod $37^1$. At the end of the rod 41 a fourth link arm 42 is pivoted around an axis 43. The link arm 42 carries a turning means consisting of two electric motors, a first motor 44 with a relatively high rotational speed, and a second motor 45 with a relatively low rotational speed. The latter has a higher torque than the former. The motor 45 is provided with a free wheel, which is driven by the first motor 44 with a driving belt as long as the shaft $23^1$, coupled to the free wheel, does not make too high torque load. As soon as the clamping elements have got into contact with the line, the torque load of the shaft $23^1$ is increased, and the slower motor 45 takes over the turning work, which can be limited by an electrical switch acting at a predetermined maximum electric current, or may be limited by a torque limiting recess at the shaft $23^1$ as was described above. In this case the motor 45 is provided with a releasable coupling to the shaft $23^1$, so that the motor 45 is released from the shaft $23^1$ if the fourth link arm 42 is swinged out. This is achieved by acting upon the fourth link arm 42 by a fifth link arm 46, pivoted at one end in the fourth link arm 42, and at its other end pivoted in a perpendicular shaft dowel 47, which in turn is provided with two short sixth and seventh link arms 48, 49, pivoted in a protrusion 50 at the lower side of the rod 41. In a starting position, corresponding to said first position of the clamping elements 5, 7, the shaft dowel 47 rests upon a yoke arm 51, which at one end is pivoted around said axis 43, and at its other end is formed like a loop, which is carried by a helicopter, or crane etc. In this position the fourth link arm 42 is in its inner position, and the motor 45 is connected to the shaft 231. The yoke arm 51 is locked in this position by a lock means, comprising an eighth link arm 52, which at its upper end is pivoted around an axis 53 in the yoke arm 51. The eighth link arm 52 is provided with a protrusion 53, cooperating with a corresponding protrusion 54 at the rod 41. The eighth link arm 52 extends downwards between the two semispheres 1, 2. In a position, corresponding to the said second position of the clamping elements 5, 7, the second semisphere hits the eighth link arm 52, and the yoke arm 51 is released to swing upwards, and the shaft dowel 47 is lifted, turning so that the fifth link arm 46 pushes the fourth link arm 42, releasing the motor 45 from the shaft 231. In this second position the rod 371 is released from the guide bar which is not shown, and the carrying means may be lifted from the remaining marking body, which is now fastened to the line 26. A reference carriage for marking of the correct positions at the line for fastening of marking bodies is shown in FIG. 6. It comprises a house 55, formed to be hanged on a line 26. It comprises driving wheel 56, measuring wheel 57, a driving means 58 and a measurement transmitter 59. A clamp 60 is provided for carrying the reference carriage. This is provided with equipment for wireless communication, e.g. by IR radiation. It is arranged to start by an incoming impulse and to move a predetermined distance on the line and then to stop. This procedure is repeated for every incoming impulse.

I claim:

1. A device for achieving visual marking of a line or wire, especially for marking of a substantially horizontal ground wire in a transfer system for high voltage electricity, at a relatively high altitude above the ground, comprising:
    a shell, preferably an outer shell, carried by
    a fastening device, comprising clamping elements, provided to encompass the line, in a first position, and to clamp the line in a second position to fasten the shell thereto, and
    a carrying means, in turn carried by a lifting device such as a helicopter or crane, in which the carrying means in said first position carries the fastening device, and is arranged to be released, in said second position, from the fastening device,
    so that said shell, in the form of a marking body remains attached to said line, free from the carrying means, said shell being formed like a sphere, divided into two substantially identical semipheres, said fastening device being provided with indicating means for indicating the correct position of the fastening device in relationship to the line, for the clamping elements to grasp the line, cooperating.

2. A device according to claim 1, in which said indicating means comprise two contact means or sensors, provided at a mutual horizontal distance, to give a signal, when both sensors touch the line at the same time.

3. A device according to claim 1, in which the fastening device comprises a first frame portion, which in its lower part is formed like a first clamping element, and a first link arm pivoted to said first frame portion, said first link arm including a portion formed at the inside like a second clamping element, the first link arm being attached, at the portion thereof which is located distal from the second clamping element to spring means which pretensions said clamping elements towards said second position of said clamping elements, said clamping means being kept in a first position by a link arrangement, which when touching the line releases said first link arm, so that the clamping elements go to their second position by the action of the spring means.

4. A device according to claim 3, in which the carrying means is releasably received in the fastening device, in said first position of the clamping elements locked by a protrusion at said first link arm, and in said second position of said clamping elements, released from the fastening device.

5. A device according to claim 3, in which the shell is formed like a sphere, divided into two identical semispheres, the first semisphere being attached to said fastening device, the second semisphere being pivoted at its upper part in the fastening device, the second semisphere being held out, in the first position of the clamping elements by the first link arm via a second link arm, from the first semisphere, but being closed to the first semisphere, when the clamping elements are in their second position.

6. A device according to claim 1, in which said fastening device comprises a second frame portion, carrying a first clamping element, preferably formed like a profile piece, for grasping part of the circumference of the line, further comprising a third frame portion, carrying a second clamping element, formed like the first clamping element, a turnable shaft being provided, which by turning by a turning means, brings the both frame portions together, so that the clamping elements, from each side, cooperating grasp the line, fastening it.

7. A device according to claim 6, in which said shaft is provided with means, limiting the torque, preferably in the form of an axially limited rotation symmetrical recess of the diameter of the shaft.

8. A device according to claim 6, in which the turnable shaft is arranged to be turned by an electric motor.

9. A device according to any of the claim 8, there is provided turning means with a relatively high first speed of rotation and a low torque, and a relatively low second speed of rotation and high torque.

10. A device according to claim 9, in which a turning means is carried by the carrying means, being releasable from the turnable shaft by a link arrangement, in said second position of the clamping elements.

* * * * *